United States Patent [19]

Pfeifer et al.

[11] 4,195,165
[45] Mar. 25, 1980

[54] ALIPHATIC POLYAMIDE FROM DISUBSTITUTED DECANE DIAMINE

[75] Inventors: Josef Pfeifer, Therwil; Heinz Peter, Rheinfelden, both of Switzerland

[73] Assignee: Ciba-Geigy Corporation, Ardsley, N.Y.

[21] Appl. No.: 954,807

[22] Filed: Oct. 26, 1978

[30] Foreign Application Priority Data

Oct. 28, 1977 [CH] Switzerland .................. 13147/77

[51] Int. Cl.$^2$ .............................. C08G 69/26
[52] U.S. Cl. ........................... 528/346; 260/33.4 R; 528/347; 528/349
[58] Field of Search ................... 528/349, 348, 346

[56] References Cited

U.S. PATENT DOCUMENTS

3,939,147  2/1976  Hugelin et al. ............... 260/239 BC

OTHER PUBLICATIONS

Chemical Abstracts, Vol. 36 (1942), 4720$^4$

Primary Examiner—Harold D. Anderson
Attorney, Agent, or Firm—Luther A. R. Hall

[57] ABSTRACT

The polyamides according to the invention are mainly transparent (amorphous), but in some cases also partially crystalline. They have a reduced specific viscosity (0.5% in m-cresol at 25° C.) of at least 0.3 dl/g, and consist of recurring structural elements of the formula I

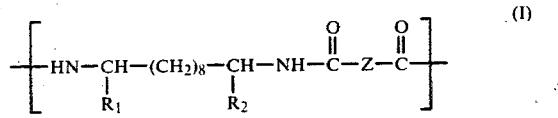

in which $R_1$ and $R_2$ are monovalent aliphatic or cycloaliphatic radicals, and Z is a bivalent aliphatic radical. The dicarboxylic acid structural radicals are derived in particular from adipic acid. The polyamides have high glass transition temperatures, and have a low water absorption and also good stability to hydrolysis. They can be processed into moulded articles (for example by the injection moulding process and extrusion process).

12 Claims, No Drawings

ALIPHATIC POLYAMIDE FROM DISUBSTITUTED DECANE DIAMINE

The invention relates to novel, predominantly transparent, aliphatic polyamides, to processes for producing them, and to their use for producing moulded articles.

From the French Patent Specification No. 1,476,146 are known aliphatic polyamides from decane-1,10-dicarboxylic acid and trimethylhexamethylenediamine, particularly a mixture of 2,2,4- and 2,4,4-trimethylhexamethylenediamine. These prior known aliphatic polyamides have relatively low glass transition temperatures, and leave much to be desired with regard to absorption of water and to dimensional stability. Furthermore, the properties of these known aliphatic polyamides, especially the mechanical and electrical properties, become severely impaired under the action of moisture. These known polyamides swell in the presence of moisture, and their original hardness and tensile strength decrease sharply.

The object of the present invention was therefore the production of novel aliphatic polyamides free from these disadvantages.

The novel polyamides according to the invention have a reduced specific viscosity (referred to in the following also as reduced solution viscosity) of at least 0.3 dl/g, preferably of 0.3 to about 3.0 dl/g, and particularly of about 0.4 to 2.0 dl/g, measured on a 0.5% solution in m-cresol at 25° C., and they consist of identical or different recurring structural elements of the formula I

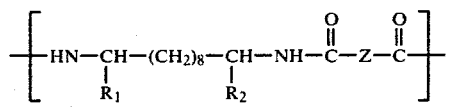

in which $R_1$ and $R_2$ independently of one another are straight-chain or branched-chain alkyl having 3–20 C atoms or cycloalkyl having 4–12 C atoms, and Z is an aliphatic radical having at least 2 C atoms.

The following may be mentioned as examples of straight-chain or branched-chain alkyl groups denoted by $R_1$ or $R_2$: the n-propyl, isopropyl, n-butyl, sec-butyl, tert-butyl, n-pentyl, 2-pentyl, 3-pentyl, n-hexyl, 3-heptyl, n-heptyl, n-octyl, n-nonyl, n-decyl, n-dodecyl, n-tetradecyl, n-hexadecyl, n-octadecyl and eicosane groups.

$R_1$ and $R_2$ are preferably identical radicals per recurring structural element, especially isopropyl or straight-chain or branched-chain alkyl groups having 5–11 C atoms, or cycloalkyl groups having 5–8 C atoms.

As an aliphatic radical, Z is in particular straight-chain or branched-chain alkylene having 2–12 C atoms, and especially 4–10 C atoms. Examples of alkylene groups of this type are the tetramethylene, pentamethylene, hexamethylene, heptamethylene, octamethylene, decamethylene and dodecamethylene groups.

Preferred polyamides are those in which $R_1$ and $R_2$ per recurring structural element of the formula I are each isopropyl or straight-chain or branched-chain alkyl having 5–11 C atoms, or are each cycloalkyl having 5–8 C atoms, and Z is straight-chain or branched-chain alkylene having 4–10 C atoms. More particularly preferred polyamides are those in which $R_1$ and $R_2$ are each n-pentyl, 3-pentyl, n-hexyl, 3-heptyl or cyclohexyl, cycloheptyl or cyclooctyl, and Z is —$(CH_2)_4$—.

Further preferred polyamides according to the invention are the following four special types:

1. Transparent polyamides which consist of recurring structural elements of the formula IV

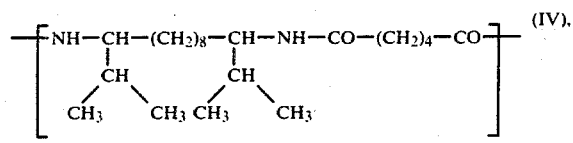

and which have a reduced specific viscosity (0.5% in m-cresol at 25° C.) preferably of about 1.1 dl/g.

2. Transparent polyamides which consist of recurring structural elements of the formula V

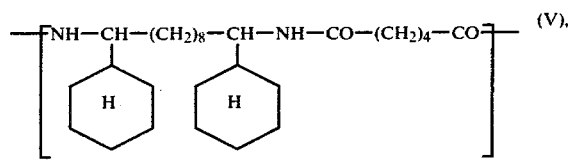

and which have a reduced specific viscosity (0.5% in m-cresol at 25° C.) preferably of about 0.75 dl/g.

3. Partially crystalline polyamides which consist of recurring structural elements of the formula VI

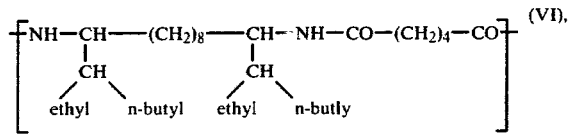

and which have a reduced specific viscosity (0.5% in m-cresol at 25° C.) preferably of about 0.6 dl/g.

4. Transparent polyamides which consist of recurring structural elements of the formula VII

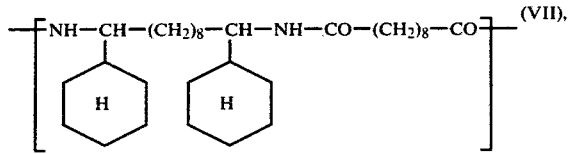

and which have a reduced specific viscosity (0.5% in m-cresol at 25° C.) preferably of about 0.7 dl/g.

The polyamides according to the invention can be produced by reacting a diamine of the formula II

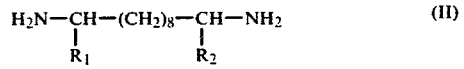

with a dicarboxylic acid of the formula III

or with an amide-forming derivative thereof, wherein $R_1$, $R_2$ and Z have the meanings given under the formula I. It is possible to use in the reaction according to the invention also different diamines of the formula II and different dicarboxylic acids of the formula III.

As amide-forming derivatives of the dicarboxylic acid of the formula III, there can be used for example the corresponding dihalides, particularly the dichlorides, dinitriles and dialkyl esters or diaryl esters, especially dialkyl esters having 1-C atoms in each of the alkyl moieties and diphenyl esters.

The reaction of the diamines of the formula II with the dicarboxylic acids of the formula III, or with amide-forming derivatives thereof, can be performed by methods known per se. The preferred production process is the melt polycondensation process in several stages. In this case, essentially stoichiometric amounts of diamine of the formula II and dicarboxylic acid of the formula III, or salts from the stated diamines and dicarboxylic acids, are pre-condensed under pressure at temperatures of about 220° to 300° C. in the melt, advantageously under inert gas, such as nitrogen. For this pre-condensation reaction there are advantageously used salts of the aforementioned type, which are produced in a preliminary stage from essentially stoichiometric amounts of diamine of the formula II, or of mixtures thereof, and dicarboxylic acids of the formula III in suitable inert organic solvents. Suitable inert organic solvents are for example: cycloaliphatic alcohols such as cyclopentanol and cyclohexanol, and particularly aliphatic alcohols having up to 6 C atoms, such as methanol, ethanol, n-propanol, butanols, pentanols and hexanols, and also mixtures of such solvents with water. The precondensate can be subsequently further condensed, at temperatures of between about 220° and 300° C. under normal pressure, and advantageously likewise in an inert-gas atmosphere, until the polyamides according to the invention have been formed. It can be of advantage under certain circumstance to apply a vacuum after completion of the polycondensation reaction.

The polyamides according to the invention can be produced also by melt polycondensation of diamines of the formula II and essentially stoichiometric amounts of an amide-forming derivative of the dicarboxylic acids of the formula III, for example activated esters, especially diphenyl esters. The reaction temperatures are in general between about 220° and 300° C. And, finally, the polyamides according to the invention can optionally also be produced, in a manner known per se, by polycondensation in solution or by inerfacial surface polycondensation.

The dicarboxylic acids of the formula III and the diamines of the formula II are known or can be produced by methods known per se. The diamines of the formula II can be produced in a particularly simple manner by catalytically hydrogenating in the 3,12-position correspondingly substituted 1,2-diaza-1,5,9-cyclododecatriens or 1,2-diazacyclododecanes in the presence of an inert organic solvent.

The polyamides according to the invention have high glass transition temperatures. They are distinguished in particular by a low water absorption, good stability to hydrolysis and improved dimensional stability. Furthermore, the properties of the polyamides according to the invention, such as the mechanical and electrical properties, are only slightly affected by the action of moisture.

The polyamides according to the invention are in general transparent. Some of them however lose their transparency in consequence of partial crystallinity. An example of this is the polyamide according to Example 12, which is based on adipic acid and 6,15-diamino-5,16-diethyleicosane.

The polyamides according to the invention can be processed, by methods know per se, into moulded articles of the most varied kind (amorphous and crystalline), for example by the injection-moulding process and the extrusion process. They are particularly suitable for producing transparent apparatus and parts of apparatus from the melt. Further fields of application are for example their use as adhesives for organic materials, such as leather and textiles, or for the production of lacquers. In the case of partially crystalline polyamides, they can be used to produce filaments.

EXAMPLE 1

A solution of 10.0 g of 5,14-diaminooctadecane in ethanol is added at 50° C. to a solution of 5,11-adipic acid in 30 ml of ethanol. The reaction mixture is subsequently cooled to 0° C., whereupon the formed salt precipitates from the solution. The salt is filtered off, and dried in vacuo at 90° C.; yield: 14.7 g (97% of theory).

10 g of this salt is sealed under nitrogen into a bomb tube and heated for 3 hours at 260° C. After cooling to 20°-25° C., the pre-condensate is removed from the tube and transferred to a condensing tube which is provided with a device for introducing nitrogen. The pre-condensate is melted down at 260° C. under nitrogen, and is held at this temperature for 10 hours as nitrogen is being passed through. The polycondensate on cooling solidifies to form a transparent substance. The reduced solution viscosity of the resulting polyamide, measured on a 0.5% solution in m-cresol at 25° C., is 0.83 dl/g; glass transition temperature, determined by means of differential calorimetry (DSC), is 87° C.

With the aid of a hydraulic press, there is produced from the polyamide at 200° C. a sheet approximately 0.3 mm thick. This is stored for 1 week at 20°-25° C. with 65% relative humidity, and after this time the sheet has absorbed 0.7% by weight of water. No further water is absorbed on further storage under the stated conditions.

EXAMPLES 2-8

Using the method described in Example 1, further polyamides are produced from adipic acid and different diamines, and are subsequently processed into sheets. The reaction components and also the properties of the polyamides obtained are summarised in Table 1.

EXAMPLE 9

9.54 g of diphenyl adipate and 10.0 g of 4,13-diamino-3,14-diethylhexadecane are sealed under nitrogen into a bomb tube, and pre-condensed at 220° C. for 4 hours. The pre-condensate which has formed is then heated in a second reaction vessel for 2 hours at 260° C. under normal pressure and with the passing through of nitrogen. For the purpose of effecting complete removal of the phenol which has been split off, the melt is maintained at 260° C. for a further 2 hours under a reduced pressure of 14 Torr. The melt on cooling solidifies to form a transparent substance. The polyamide obtained is then processed, in the manner described in Example 1, into the form of a sheet, the properties of which are given in Table 1.

EXAMPLES 10-14

In a manner analogous to that described in Example 9, further polyamides are produced from diphenyl adipate and different diamines, and these polyamides are processed into sheets. The reaction components and also the properties of the polyamides obtained are summarised in Table 1.

EXAMPLE 15

A mixture of 5.00 g of 1,10-diamino-1,10-dicyclohexyldecane and 3.022 g of sebacic acid are sealed under nitrogen into a bomb tube, and heated for 3 hours at 260° C. After cooling to room temperature, the pre-condensate is polycondensed in a condensing tube for 8 hours at 260° C. whilst nitrogen is being passed through. The properties of the polyamide are listed in Table 1.

EXAMPLE 16

Example 15 is repeated with the difference that, in place of 1,10-diamino-1,10-dicyclohexyldecane, there is used an equivalent amount of 3,12-diamino-2,13-dimethyltetradecane. The properties are shown in Table 1.

EXAMPLES 17–18

Polyamides from equivalent amounts of dodecandioic acid (1,12) and in each case a diamine are produced under the reaction conditions described in Example 15.

Composition and properties of the polyamides are summarised in Table 1.

rotary evaporator, and the product is purified by distillation.

There is obtained as the main fraction 462 g (48% of theory) of 4,13-diaminohexadecane as colourless oil (b.p. 132°–135° C./0.01 Torr; $n_D^{20}=1.4590$; IR (liquid) inter alia bands at 3278 and 1613 cm$^{-1}$).

(b) 5,14-Diaminooctadecane

If there is used in the manner described under (a), instead of 942 g (3.79 mols), of 3,12-dipropyl-1,2-diaza-1,5,9-cyclododecatriene, 208 g (0.75 mol) of 3,12-dibutyl-1,2-diaza-1,5,9-cyclododecatriene (diastereoisomeric mixture) and correspondingly reduced amounts of catalyst and solvent, the procedure otherwise being the same, there is obtained as the main fraction 132.8 g (62.3% of theory) of 5,14-diaminooctadecane as colourless oil (b.p. 149° C./0.001 Torr; $n_D^{20}=1.4593$; IR (liquid) inter alia bands at 3333, 3267 and 1613 cm$^{-1}$).

(c) 6,15-Diaminoeicosane

If there are used in the manner described under (a), instead of 942 g (3.79 mols) of 3,12-dipropyl-1,2-diaza-1,5,9-cyclododecatriene, 220 g (0.71 mol) of 3,12-dipentyl-1,2-diazacyclododecane (diastereoisomeric mixture)

Table 1

| Example No. | Dicarboxylic acid | Diamine | Water absorption % by wt.[1] | Glass transition temperature[2] | reduced solution viscosity[3] |
|---|---|---|---|---|---|
| 2 | adipic acid | 6,15-diaminoeicosane | 0.3 | 106 | 0.93 |
| 3 | " | 7,16-diaminodocosane | 0.3 | 109 | 0.79 |
| 4 | " | 4,13-diaminohexadecane | 1.3 | 76 | 0.97 |
| 5 | " | 3,12-diamino-2,13-dimethyltetradecane | 1.3 | 100 | 1.13 |
| 6 | " | 1,10-diamino-1,10-dicyclohexyldecane | 1.0 | 116 | 0.73 |
| 7 | " | 4,13-diamino-2,15-dimethylhexadecane | 0.7 | 90 | 0.78 |
| 8 | " | 1,10-diamino-1,10-dicyclopentyldecane | 1.0 | 107 | 0.84 |
| 9 | diphenyl adipate | 4,13-diamino-3,14-diethylhexadecane | 0.3 | 101 | 0.70 |
| 10 | " | 10,19-diaminooctacosane | 0.2 | 102 | 0.46 |
| 11 | " | 12,21-diaminodotriacontane | 0.2 | 104 | 0.54 |
| 12 | " | 6,15-diamino-5,16-diethyleicosane | 0.3 | 128[4] | 0.61 |
| 13 | " | 1,10-diamino-1,10-dicycloheptyldecane | 0.8 | 112 | 0.76 |
| 14 | " | 1,10-diamino-1,10-dicyclooctyldecane | 0.8 | 117 | 0.84 |
| 15 | sebacic acid | 1,10-diamino-1,10-dicyclohexyldecane | 0.8 | 100 | 0.70 |
| 16 | " | 3,12-diamino-2,13-dimethyltetradecane | 1.1 | 82 | 0.77 |
| 17 | dodecandioic acid (1.12) | 3,12-diamino-2,13-dimethyltetradecane | 1.0 | 73 | 0.82 |
| 18 | dodecandioic acid (1.12) | 1,10-diamino-1,10-dicyclohexyldecane | 0.6 | 92 | 0.77 |
| Comparative examples | | | | | |
| a) decane-1,10-dicarboxylic acid | mixture of 2,2,4- and 2,4,4-trimethyl-hexamethylenediamine | | 2.2 | 24 | 1.19 |
| b) adipic acid | " | | 5.2 | 61 | 1.64 |

[1] water absorption after 1 week's storage at 20–25° C. with 65% relative humidity
[2] determined by means of differential calorimetry (DSC)
[3] measured on a 0.5% solution in m-cresol at 25° C. (dl/g)
[4] the polyamide is partially crystalline with melting point: 155° C.; melting heat: 6.7 cal/g The diamines used in the above Examples can be produced as follows:

(a) 4,13-Diaminohexadecane 942 g (3.79 mols) of 3,12-dipropyl-1,2-diaza-1,5,9-cyclododecatriene (diastereoisomeric mixture) is dissolved in 3800 ml of t-butanol in an autoclave fitted with a stirrer. After the addition of 90 g of a rhodium-/aluminium oxide catalyst (5% by weight of Rh), hydrogen is injected up to a pressure of 130–150 bars, and hydrogenation is performed at 150°–180° C. until the absorption of hydrogen is finished. After cooling, the excess hydrogen is released, the suspension is drawn by suction out of the autoclave, and the catalyst is filtered off with suction through a small amount of "Hyflo" (filtering auxiliary). The filtrate is concentrated in a and correspondingly reduced amounts of catalyst and solvent, with otherwise the same procedure, there is obtained, as the main fraction, 136 g (61.3% of theory) of 6,15-diaminoeicosane as colourless oil [b.p. 167°–170° C./0.001 Torr; $n_D^{20}=1.4603$; IR (liquid) inter alia bands at 3378, 3289 and 1613 cm$^{-1}$].

(d) 7,16-Diaminodocosane

If there are used in the manner described under (a), instead of 942 g (3.79 mols) of 3,12-dipropyl-1,2-diaza-1,5,9-cyclododecatriene, 190 g (0.56 mol) of 3,12-dihexyl-1,2-diazacyclododecane (diastereoisomeric mixture) and correspondingly reduced amounts of catalyst and solvent, with otherwise the same procedure, there is obtained as main fraction 130 g (68% of theory) of 7,16-diaminodocosane as colourless oil [b.p. 184°

C./0.02–0.005 Torr; $n_D^{20} = 1.4624$; IR (liquid) inter alia bands at 3355, 3278 and 1613 cm$^{-1}$].

(e) 10,19-Diaminooctacosane

If there are used in the manner described under (a), instead of 942 g (3.79 mols) of 3,12-dipropyl-1,2-diaza-1,5,9-cyclododecatriene, 100 g (0.24 mol) of crude 3,12-dinonyl-1,2-diaza-1,5,9-cyclododecatriene (diastereoisomeric mixture) and correspondingly reduced amounts of catalyst and solvent, with otherwise the same procedure, there is obtained, as the main fraction, 40.4 g (40% of theory) of 10.19-diaminooctacosane [m.p. 33°–37° C.; IR (CH$_2$Cl$_2$) inter alia bands at 3225 and 1582 cm$^{-1}$].

(f) 12,21-Diaminodotriacontane

If there are used in the manner described under (a), instead of 942 g (3.79 mols) of 3,12-dipropyl-1,2-diaza-1,5,9-cyclododecatriene, 100 g (0.21mol) of crude 3,12-diundecyl-1,2-diaza-1,5,9-cyclododecatriene (diastereoisomeric mixture) and correspondingly reduced amounts of catalyst and solvent, with the procedure otherwise being the same, there is obtained 64.3 g (64% of theory) of 12,21-diaminodotriacontane [m.p. 45°–46° C.; IR (CH$_2$Cl$_2$) inter alia bands at 3174 and 1582 cm$^{-1}$].

(g) 3,12-Diamino-2,13-dimethyltetradecane

If there are used in the manner described under (a), intead of 942 g (3.79 mols) of 3,12-dipropyl-1,2-diaza-1,5,9-cyclododecatriene, 250 g (1 mol) of 3,12-diisopropyl-1,2-diaza-1,5,9-cyclododecatriene (diastereoisomeric mixture) and correspondingly reduced amounts of catalyst and solvent, with the procedure otherwise being the same, there is obtained, as the main fraction, 238 g (92% of theory) of 3,12-diamino-2,13-dimethyltetradecane as colourless oil [b.p. 106°–109° C./0.01 Torr; $n_D^{20} = 1.4600$; IR (liquid) inter alia bands at 3355, 3278 and 1613 cm$^{-1}$].

(h) 4,13-Diamino-3,14-diethylhexadecane

If there are used in the manner described under (a), instead of 942 g (3.79 mols) of 3,12-dipropyl-1,2-diaza-1,5,9-cyclododecatriene, 49 g (0.159 mol) of 3,12-di-(3-pentyl)-1,3-diazacyclododecane and correspondingly reduced amounts of catalyst and solvent, there is obtained, after chromatographic purification and distillation, 26.8 g (54% of theory) of 4,13-diamino-3,14-diethylhexadecane as colourless oil [b.p. 141°–143° C./0.004 Torr; $n_D° = 1.4666$; IR (liquid) inter alia bands at 3378, 3278 and 1613 cm$^{-1}$].

(i) 1,10-Diamino-1,10-dicyclohexyldecane

If there are used in the manner described under (a), instead of 942 g (3.79 mols) of 3,12-dipropyl-1,2-diaza-1,5,9-cyclododecatriene, 328.5 g (1 mol) of 3,12-dicyclohexyl-1,2-diaza-1,5,9-cyclododecatriene (diastereoisomeric mixture) and correspondingly reduced amounts of catalyst and solvent, using otherwise the same procedure, there is obtained, as the main fraction, 304 g (90% of theory) of 1,10-diamino-1,10-dicyclohexyldecane as colourless oil [b.p. 190°–193° C./0.05 Torr; $n_D^{20} = 1.4944$; IR (liquid) inter alia bands at 3355, 3278 and 1613 cm$^{-1}$].

(k) 6,15-Diamino-5,16-diethyleicosane

If there are used in the manner described under (a), instead of 942 g (3.79 mols) of 3,12-dipropyl-1,2-diaza-1,5,9-cyclododecatriene, 74.8 g (0.2 mol) of 3,12-di-(3-heptyl)-1,2-diazacyclododecane (diastereoisomeric mixture) and correspondingly reduced amounts of catalyst and solvent, using otherwise the same procedure, there is obtained, after chromatographic purification and distillation, 29.9 g (40% of theory) of 6,15-diamino-5,16-diethyleicosane as colourless oil [b.p. 170° C./0.01 Torr; $n_D^{20} = 1.4662$; IR (liquid) inter alia bands at 3278 and 1613 cm$^{-1}$].

(l) 4,13-Diamino-2,15-dimethylhexadecane

If there are used in the manner described under (a), instead of 942 g (3.79 mols) of 3,12-dipropyl-1,2-diaza-1,5,9-cyclododecatriene, 400 g (1.45 mols) of 3,12-diisobutyl-1,2-diaza-1,5,9-cyclododecatriene (diastereoisomeric mixture) and correspondingly reduced amounts of catalyst and solvent, with otherwise the same procedure, there is obtained, as the main fraction, 261 g (63% of theory) of 4,13-diamino-2,15-dimethylhexadexane as colourless oil [b.p. 168°–172° C./0.4 Torr; $n_D^{20} = 1.4561$; IR (liquid) inter alia bands at 3289, 3205 and 1600 cm$^{-1}$].

(m) 1,10-Diamino-1,10-dicyclopentyldecane

If there are used in the manner described under (a), instead of 942 g (3.79 mols) of 3,12-dipropyl-1,2-diaza-1,5,9-cyclododecatriene, 200 g (0.666 mol) of crude 3,12-dicyclopentyl-1,2-diaza-1,5,9-cyclododecatriene (diastereoisomeric mixture) and correspondingly reduced amounts of catalyst and solvent, with the procedure otherwise being the same, there is obtained, after chromatographic purification and distillation, 39.2 g (19% of theory) of 1,10-diamino-1,10-dicyclopentyldecane as colourless oil [b.p. 174°–178° C./0.002 Torr; $n_D^{20} = 1.4885$; IR (liquid) inter alia bands at 3355, 3278 and 1613 cm$^{-1}$].

The 1,2-diaza-1,5,9-cyclododecatrienes and 1,2-diazacyclododecanes used as starting materials are produced by the processes described in the German Offenlegungsschriften Nos. 2,330,087 and 2,549,403.

(n) 1,10-Diamino-1,10-dicycloheptyldecane

If there are used in the manner described under (a), instead of 942 g (3.79 mols) of 3,12-dipropyl-1,2-diaza-1,5,9-cyclododecatriene, 106 g (0.3 mol) of 3,12-dicycloheptyl-1,2-diaza-1,5,9-cyclododecatriene (diastereoisomeric mixture) and correspondingly reduced amounts of catalyst and solvent, with otherwise the same procedure, there is obtained, after chromatographic purification, and 63 g (58% of theory) of 1,10-diamino-1,10-dicycloheptyldecane as colourless oil [$n_D^{20} = 1.5018$; IR (liquid) inter alia bands at 3390, 3310 and 3618 cm$^{-1}$].

(o) 1,10-Diamino-1,10-dicyclooctyldecane

If there are used in the manner described under (a), instead of 942 g (3.79 mols) of 3,12-dipropyl-1,2-diaza-1,5,9-cyclododecatriene, 65 g (0.168 mol) of 3,12-dicyclooctyl-1,2-diazacyclododecane and correspondingly reduced amounts of catalyst and solvent, with otherwise the same procedure, there is obtained, after chromatographic purification, 43.6 g (66% of theory) of 1,10-diamino-1,10-dicyclooctyldecane as colourless oil ($n_D^{20} = 1.5050$; IR (liquid) inter alia bands at 3333, 3278 and 1613 cm$^{-1}$).

We claim:

1. An aliphatic polyamide which has a reduced specific viscosity of at least 0.3 to about 3.0 dl/g, measured on a 0.5% solution of m-cresol at 25° C., and which consists of identical or different recurring structural elements of the formula I

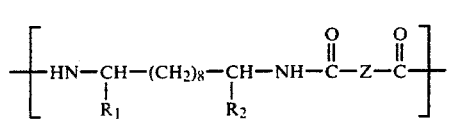

in which
R₁ and R₂ independently of one another are straight-chain or branched-chain alkyl having 3–20 C atoms, or cycloalkyl having 4–12 C atoms, and
Z is an aliphatic radical having at least 2 C atoms.

2. A polyamide according to claim 1, in which R₁ and R₂ per recurring structural element of the formula I are each identical alkyl or cycloalkyl groups.

3. A polyamide according to claim 1, in which Z is a straight-chain or branched-chain alkylene having 2–12 C atoms.

4. A polyamide according to claim 1, in which R₁ and R₂ per recurring structural element of the formula I are each isopropyl, or straight-chain or branched-chain alkyl having 5–11 C atoms, or are each cycloalkyl having 5–8 C atoms, and Z is a straight-chain or branched-chain alkylene having 4–10 C atoms.

5. A polyamide according to claim 1, in which R₁ and R₂ are each n-pentyl, 3-pentyl, n-hexyl, 3-heptyl or cyclohexyl, and Z is —(CH₂)₄—.

6. A transparent polyamide according to claim 1, which consists of recurring structural elements of the formula IV

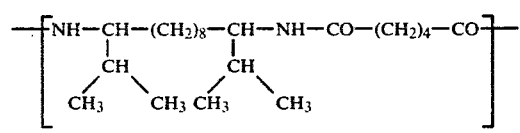

7. A transparent polyamide according to claim 1, which consists of recurring structural elements of the formula

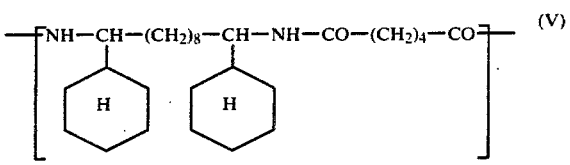

8. A partially crystalline polyamide according to claim 1, which consits of recurring structural elements of the formula VI

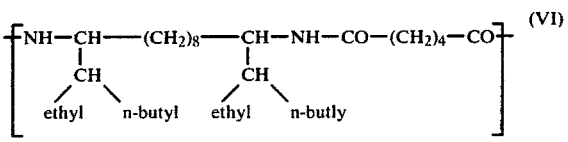

9. A transparent polyamide according to claim 1, which consists of recurring structural elements of the formula VII

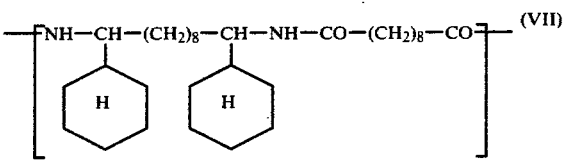

and which has a reduced specific viscosity of about 0.7 dl/g.

10. A polyamide according to claim 3 in which Z is alkylene having 4–10 C atoms.

11. A molded article of the polyamide according to claim 1.

12. A filament of the polyamide according to claim 1.